US011132858B1

(12) United States Patent
Lu et al.

(10) Patent No.: US 11,132,858 B1
(45) Date of Patent: Sep. 28, 2021

(54) CLOSING STRUCTURE OF BANKNOTE MACHINE

(71) Applicants: Po-Wen Lu, New Taipei (TW); Yun-Ping Chen, New Taipei (TW)

(72) Inventors: Po-Wen Lu, New Taipei (TW); Yun-Ping Chen, New Taipei (TW)

(73) Assignee: iBASE Gaming Inc., New Taipei (TW)

( * ) Notice: Subject to any disclaimer, the term of this patent is extended or adjusted under 35 U.S.C. 154(b) by 0 days.

(21) Appl. No.: 17/033,707

(22) Filed: Sep. 26, 2020

(30) Foreign Application Priority Data

Mar. 3, 2020 (TW) ................................ 109202330

(51) Int. Cl.
*G06Q 40/00* (2012.01)
*G07D 11/00* (2019.01)
*G07F 19/00* (2006.01)
*G07D 11/12* (2019.01)

(52) U.S. Cl.
CPC .................................... *G07D 11/12* (2019.01)

(58) Field of Classification Search
USPC .......................................................... 235/379
See application file for complete search history.

(56) References Cited

U.S. PATENT DOCUMENTS 3,510,186 A * 5/1970 Howard .................. G07F 13/10 312/35
6,978,516 B1 * 12/2005 Calderon ................ E05C 17/16 16/229
8,777,542 B2 * 7/2014 Daneshvar ........... A61G 3/0209 414/462

* cited by examiner

*Primary Examiner* — Tuyen K Vo

(57) ABSTRACT

An improved closing structure of a banknote machine includes: a banknote machine; a banknote machine gate, and characterized in that: a lower portion of the banknote machine gate is disposed with a bottom plate, one side of the bottom plate is extended with a protruding extension part and a fastening column, the lateral plate is disposed with a fastening column, at least one tension spring connected to the fastening column of the lateral plate and the fastening column of the protruding extension part; and a front portion of the banknote machine is formed with an accommodation space, so that the banknote machine gate is prevented from folding back after being opened via a pulling force provided by the tension spring.

5 Claims, 6 Drawing Sheets

CLOSING STRUCTURE OF BANKNOTE MACHINE

BACKGROUND OF THE INVENTION

1. Field of the Invention

The present invention relates to a structure, especially to an improved closing structure of a banknote machine.

2. Description of Related Art

For allowing a banknote case to be easily disposed in or taken out, a front end of a conventional banknote machine is disposed with a banknote machine gate; however, a pressurized rod is disposed between the banknote machine gate and the banknote machine and used for a purpose of opening or closing, and the conventional banknote machine gate is not provided with a positioning and fastening structure while being in an opened status, thus the banknote machine gate would become an obstacle when the banknote case is desired to be disposed in or taken out, and a hand of a user has to hold the banknote case, and the other hand thereof has be pull out the banknote machine gate, thereby causing the operation to be time consuming and labor consuming and being inconvenient in use; moreover, sharp edges at an opening of the banknote machine and sharp edges of the banknote machine gate may hurt the user when the banknote case is disposed in or taken out, thus the user is in a dangerous status, thereby not providing the operation safety and causing possible dangers, as such, the practicability is very much limited and the shortages existed in the prior art shall be improved by the skilled people in the art.

SUMMARY OF THE INVENTION

For solving the shortages existed in the prior art, one primary objective of the present invention is to provide an improved closing structure of a banknote machine, in which a lateral plate at one side of a banknote machine has a fastening column and a banknote machine gate correspondingly has a bottom plate and a protruding extension part and a fastening column, and a tension spring is connected to the fastening column of the lateral plate and the fastening column of the protruding extension part, for solving the shortages existed in the prior art.

Another objective of the present invention is to provide an improved closing structure of a banknote machine, in which a tension spring is in a stretched status when a banknote machine gate is closed, when the banknote machine gate is opened, a recovery force is supplied by the tension spring for enabling the banknote machine gate to be positioned and fastened and fully opened.

One another objective of the present invention is to provide an improved closing structure of a banknote machine, which has advantages of effectively increasing the operation safety and convenience in use, and a user can be prevented from being hurt by sharp edges of an opening of a banknote machine and sharp edges of a banknote machine gate, thereby lowering the possibility of being in danger.

The problem to be solved by the present invention is that: in a conventional banknote machine, a front end is disposed with a banknote machine gate; a pressurized rod is disposed between a banknote machine gate and the banknote machine and used for a purpose of opening or closing, and the conventional banknote machine gate is not provided with a positioning and fastening structure while being in an opened status, thus the banknote machine gate would become an obstacle when the banknote case is desired to be disposed in or taken out, and a hand of a user has to hold the banknote case, and the other hand thereof has be pull out the banknote machine gate, thereby causing the operation to be time consuming and labor consuming and being inconvenient in use; moreover, sharp edges at an opening of the banknote machine and sharp edges of the banknote machine gate may hurt the user when the banknote case is disposed in or taken out, thus the user is in a dangerous status, thereby not providing the operation safety and causing possible dangers, as such, the practicability is very much limited.

For achieving the aforesaid objectives, one technical solution provided by the present invention is to provide an improved closing structure of a banknote machine, which includes: a banknote machine, having a lateral plate at one side thereof, wherein a front end of the lateral plate has an opening; a banknote machine gate, disposed at the opening at a front end of the banknote machine, an adjacent side of the lateral plate at the lateral side of the banknote machine and the banknote machine gate is provided with at least one hinge allowing the banknote machine gate to be opened or closed, and characterized in that: a lower portion of the banknote machine gate is disposed with a bottom plate, one side of the bottom plate defined being towards the banknote machine gate connecting to the hinge is extended with a protruding extension part, a top end of the protruding extension part is disposed with a fastening column, the lateral plate adjacent to the banknote machine is disposed with a fastening column, at least one tension spring connected to the fastening column of the lateral plate and the fastening column of the protruding extension part, so that the banknote machine gate is prevented from folding back after being opened via a pulling force provided by the tension spring.

Wherein, according to the present invention, the fastening column of the protruding extension part is formed as a vertical fastening column.

Wherein, according to the present invention, the fastening column disposed on the lateral plate of the banknote machine is formed as a horizontal fastening column.

Wherein, according to the present invention, a rear end of the bottom plate is extended to a front portion at a bottom end of the opening of the banknote machine.

Wherein, according to the present invention, a front portion of the banknote machine is formed with an accommodation space allowing a banknote case to be disposed in or taken out and a front end thereof is corresponding to the opening of the banknote machine.

Advantages achieved by the present invention are as follows: with the fastening column disposed on the lateral plate at one side of the banknote machine and the bottom plate and the protruding extension part and the fastening column correspondingly disposed on the banknote machine gate, and the tension spring being connected to the fastening column of the lateral plate and the fastening column of the protruding extension part; the tension spring is stretched when the banknote machine gate is closed, when the banknote machine gate is opened, the recovery force applied by the tension spring enables the banknote machine gate to be positioned, fastened and fully opened, thereby increasing the operation safety and the operation convenience, and the user can be prevented from being hurt by the sharp edges of the opening of the banknote machine and the sharp edges of the banknote machine gate when replacing the banknote case, thereby lowering the possibility of being in danger. Accordingly, the present invention is novel and more practical in use comparing to prior.

BRIEF DESCRIPTION OF CODES

Figure 1:
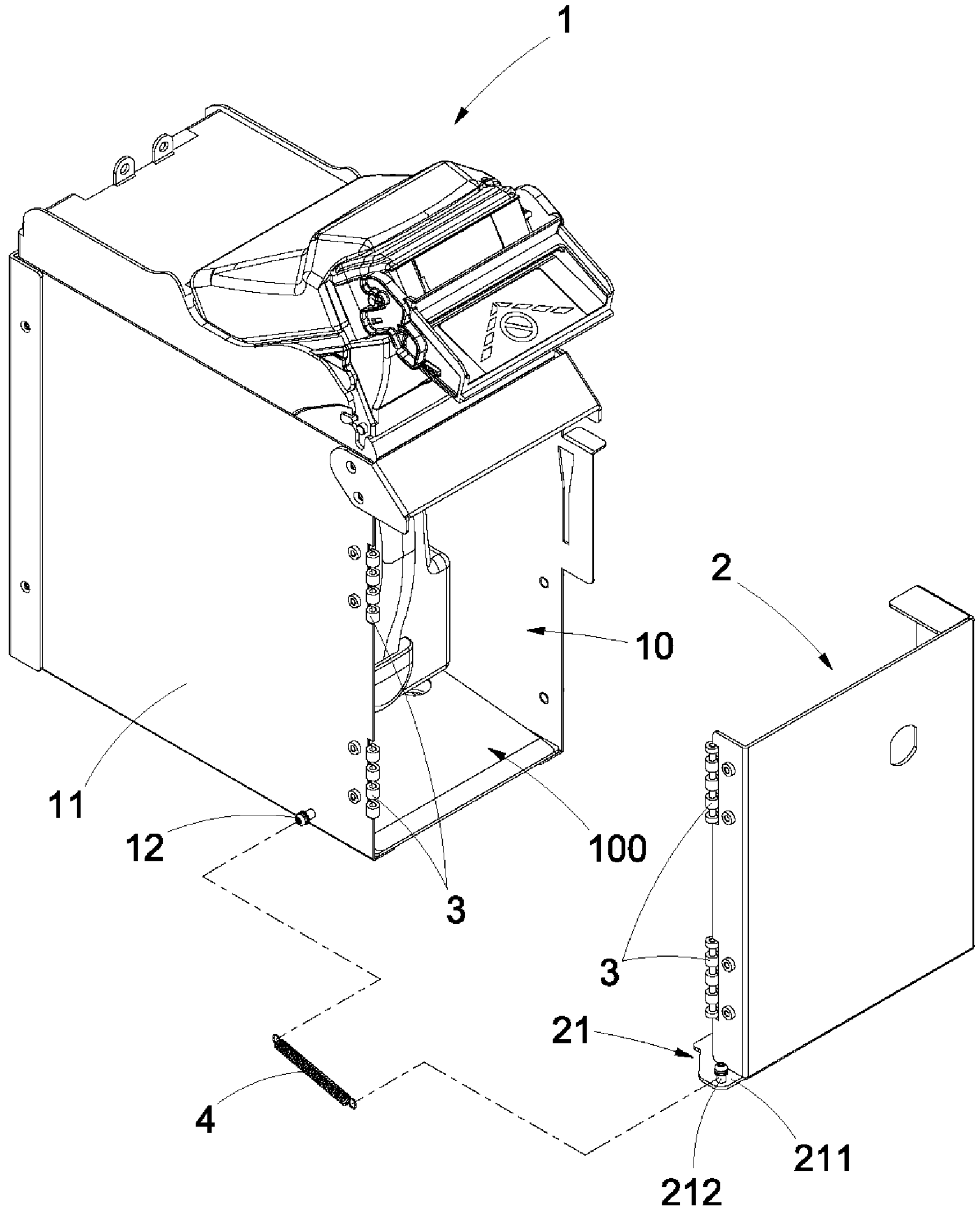
FIG. 1 is a perspective exploded view according to the present invention.

1: Banknote machine
10: Accommodation space
100: Opening
11: Lateral plate
12: Fastening column
2: Banknote machine gate
21: Bottom plate
211: Protruding extension part
212: Fastening column
3: Hinge
4: Tension spring
5: Banknote case

DETAILED DESCRIPTION OF THE PREFERRED EMBODIMENT

One preferred embodiment of the present invention will be described with reference to the drawings for illustrating the structural assembly, the technical means and the functions to be achieved by the present invention; and the actual ratios and the arrangement of components shall not be limited by the ratios and the arrangement of components in the provided figures.

Figure 2:
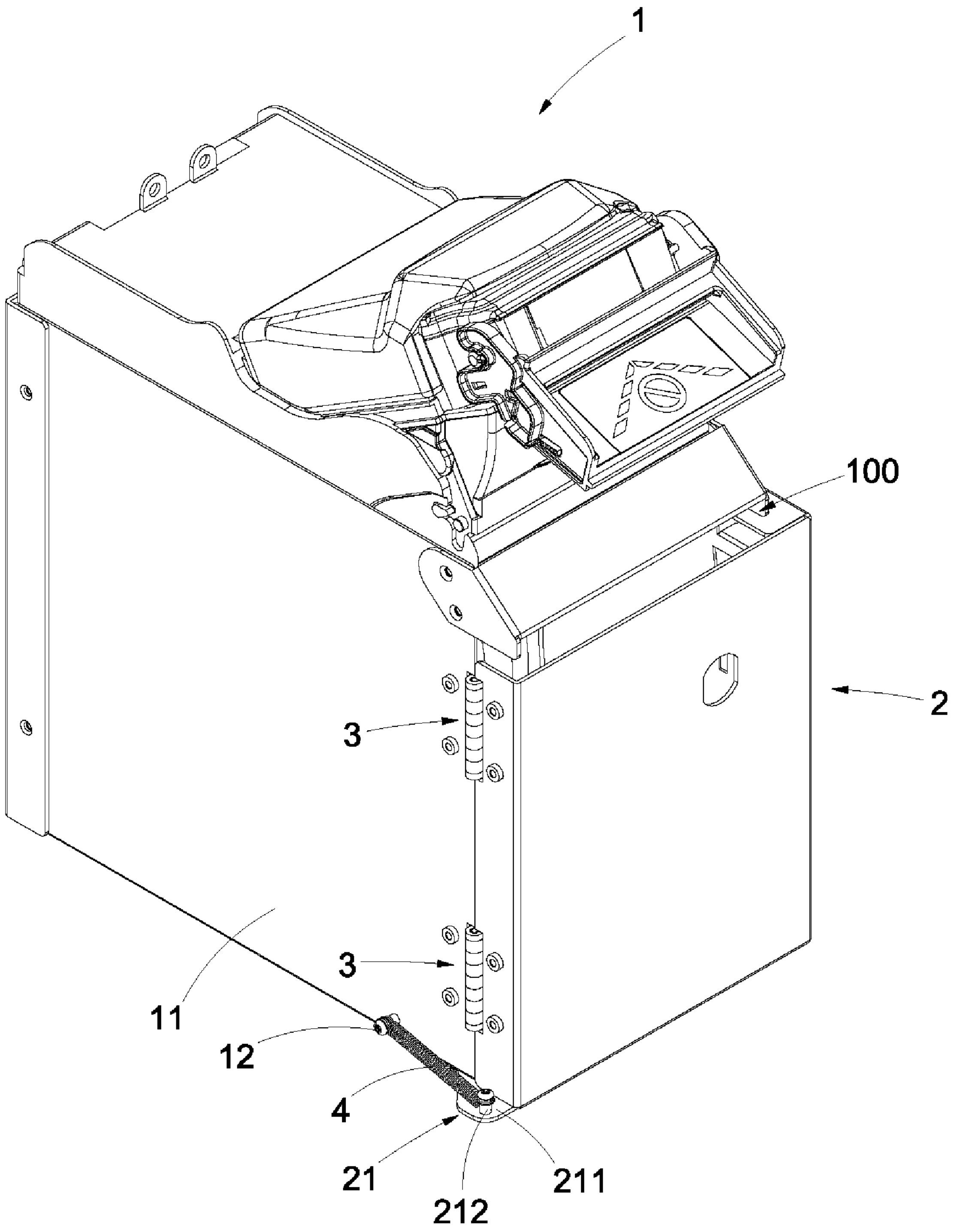
FIG. 2 is a perspective view showing the assembly according to the present invention.
Figure 3:
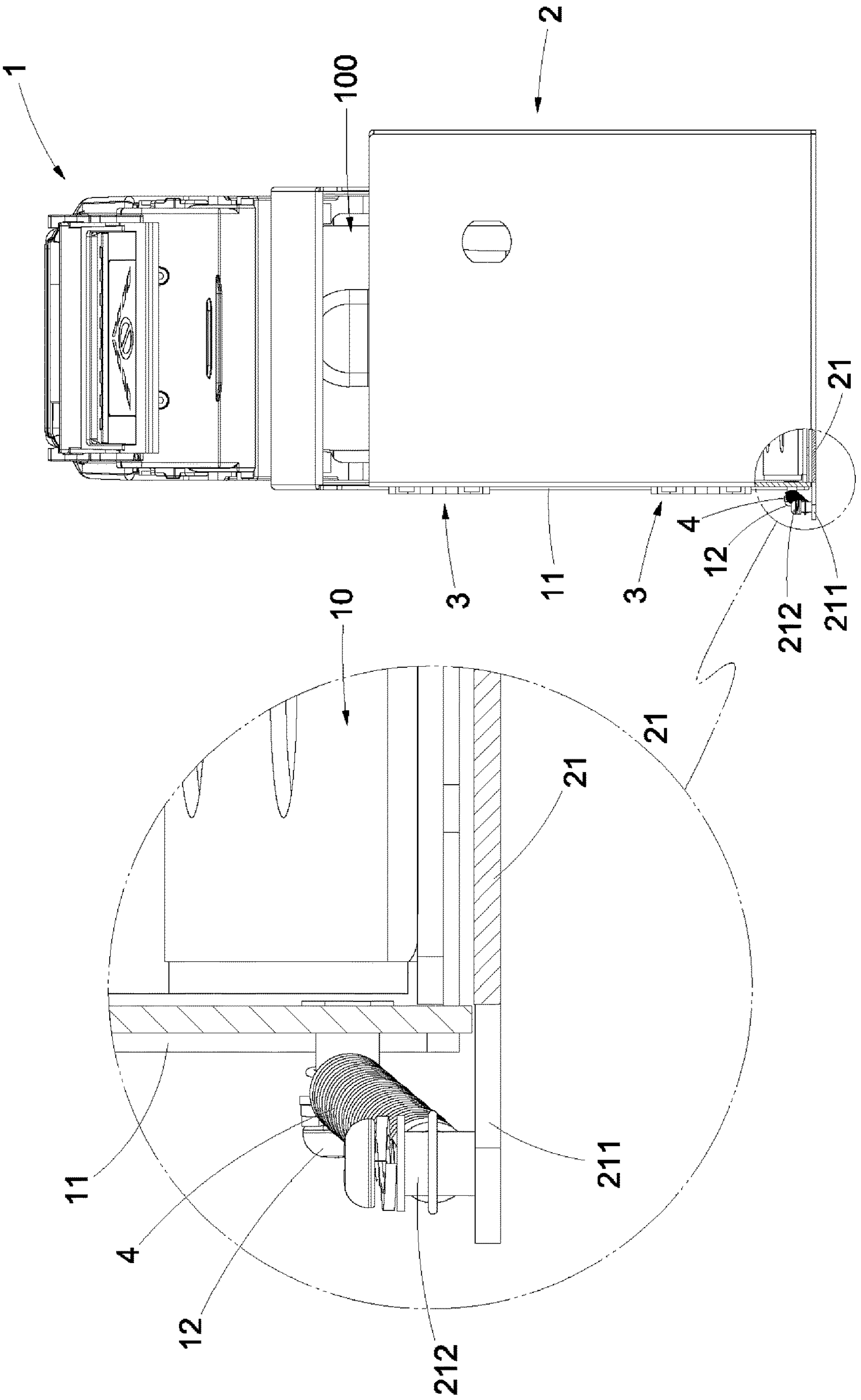
FIG. 3 is a cross sectional view showing the assembly according to the present invention.
Figure 4:
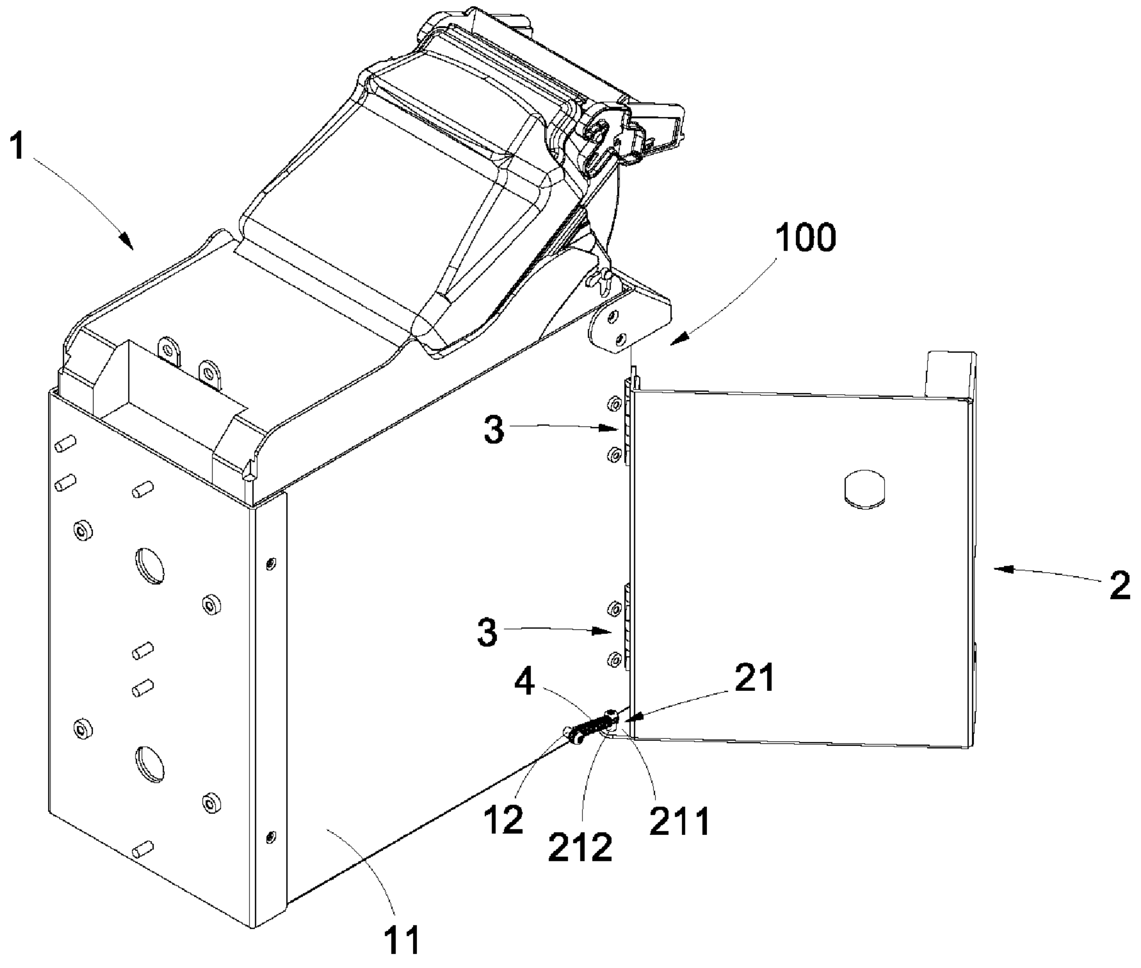
FIG. 4 is a perspective view showing the banknote machine gate being opened according to the present invention.
Figure 5:
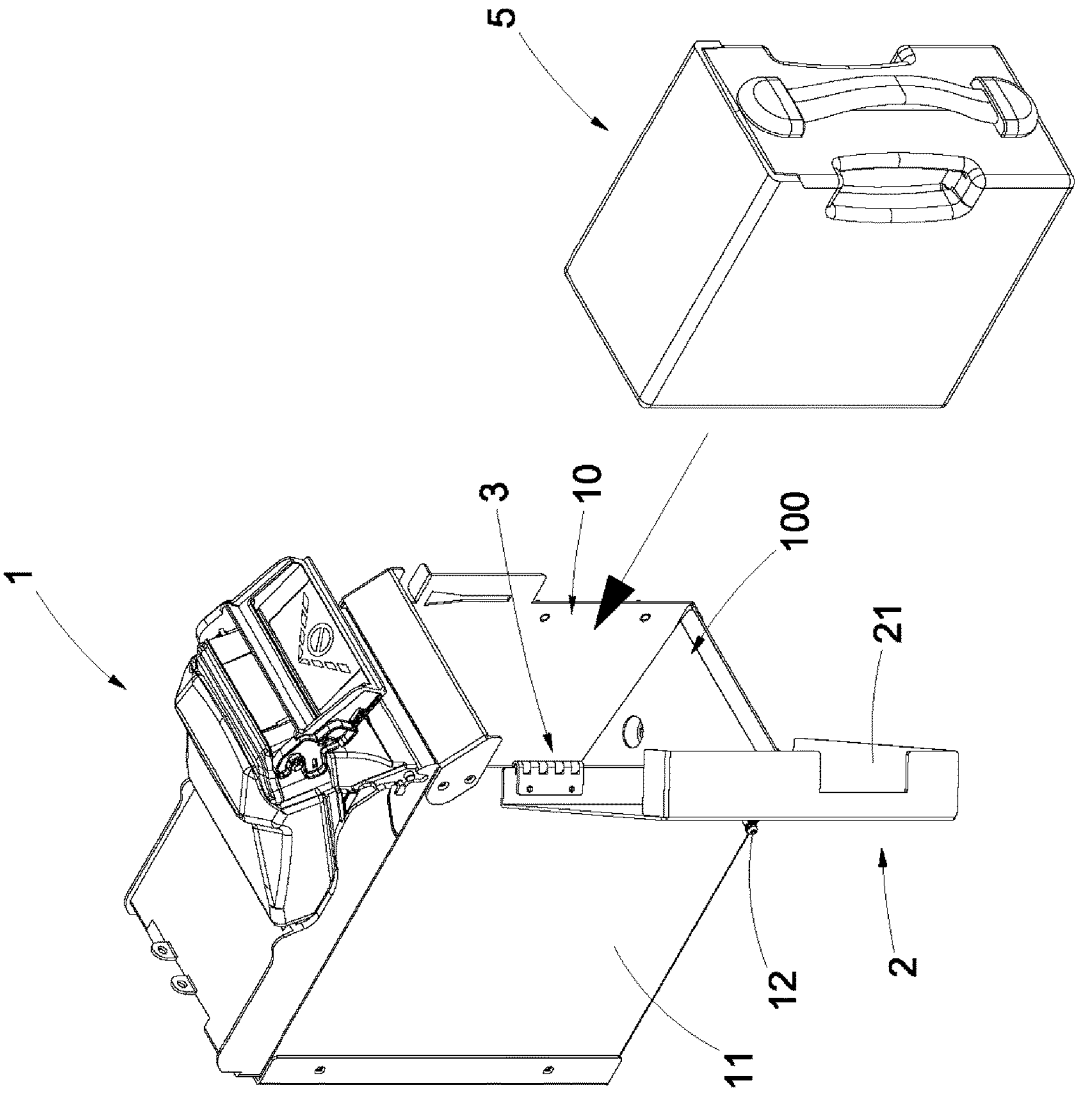
FIG. 5 is a schematic view showing the banknote case being pulled and pushed according to one embodiment of the present invention.
Figure 6:
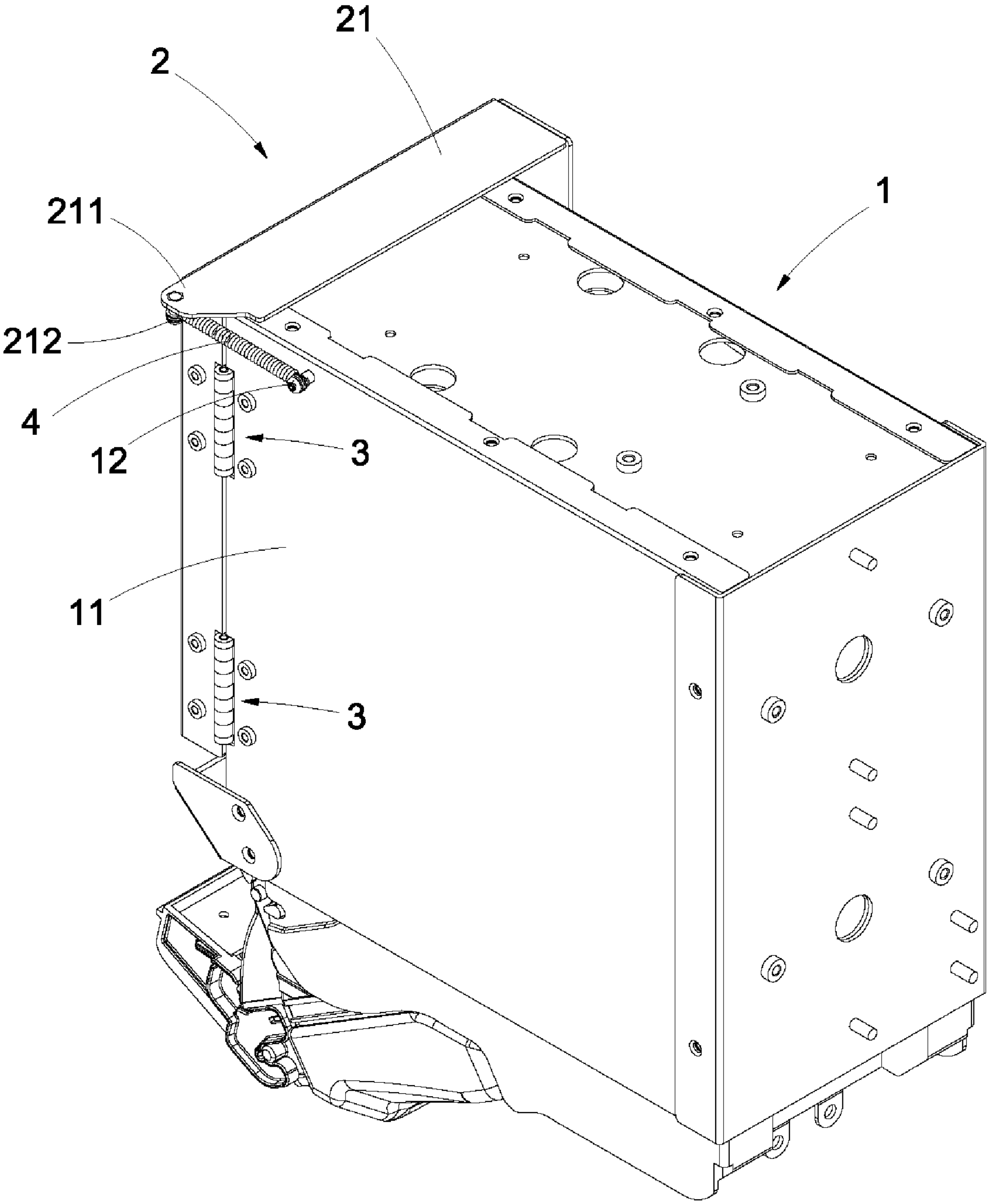
FIG. 6 is a bottom perspective view showing the banknote machine gate being closed according to the present invention.

Please refer from FIG. 1 to FIG. 6, wherein FIG. 1 is a perspective exploded view according to the present invention; FIG. 2 is a perspective view showing the assembly according to the present invention; FIG. 3 is a cross sectional view showing the assembly according to the present invention; FIG. 4 is a perspective view showing the banknote machine gate being opened according to the present invention; FIG. 5 is a schematic view showing the banknote case being pulled and pushed according to one embodiment of the present invention; and FIG. 6 is a bottom perspective view showing the banknote machine gate being closed according to the present invention. An improved closing structure of a banknote machine is disclosed according to one preferred embodiment of the present invention. The improved closing structure of the banknote machine includes: a banknote machine 1, having a lateral plate 11 at a lateral side thereof, wherein a front end of the lateral plate 11 has an opening 100 (as shown in FIG. 1, FIG. 2 and FIG. 3), a front portion of the banknote machine 1 is formed with an accommodation space 10 allowing a banknote case 5 to be disposed in or taken out and a front end thereof is corresponding to the opening 100 of the banknote machine 1 (as shown in FIG. 5); a banknote machine gate 2, disposed at the opening 100 at the front end of the banknote machine 1, wherein an adjacent side of the lateral plate 11 at the lateral side of the banknote machine 1 and the banknote machine gate 2 is provided with at least one hinge 3 allowing the banknote machine gate 2 to be opened or closed, a lower portion of the banknote machine gate 2 is disposed with a bottom plate 21, one side of the bottom plate 21 defined being towards the banknote machine gate 2 connecting to the hinge 3 is extended with a protruding extension part 211, a top end of the protruding extension part 211 is disposed with a fastening column 212, a rear end of the bottom plate 21 is extended to a front portion at a bottom end of the opening 100 of the banknote machine 1 (as shown in FIG. 6), thereby enhancing the safety and increasing the difficulty of being broken; according to this embodiment, the fastening column 2 of the protruding extension part 211 is formed as a vertical fastening column, but what shall be addressed is that the scope of the present invention is not limited to the above-mentioned arrangement, the lateral plate 11 adjacent to the banknote machine 1 is disposed with a fastening column 12, at least one tension spring 4 (as shown in FIG. 1, FIG. 2 and FIG. 3) is connected to the fastening column 12 of the lateral plate 11 and the fastening column 212 of the protruding extension part 211, according to this embodiment, the fastening column 12 disposed on the lateral plate 11 of the banknote machine 1 is formed as a horizontal fastening column, but what shall be addressed is that the scope of the present invention is not limited to the above-mentioned arrangement, and the banknote machine gate 2 can be prevented from folding back after being opened via a pulling force provided by the tension spring 4.

When the present invention is in use, the banknote machine gate 2 is in an opened status, and the hinge 3 can be served as a rotation shaft for allowing the banknote machine gate 2 to rotate, a torque and a storing recovery force (as shown in FIG. 1, FIG. 2 and FIG. 3) with a displaced angle is generated due to a prolonged distance of the tension spring 4 which is in a pulled status and disposed on the fastening column 12 of the lateral plate 11 and the fastening column 212 of the protruding extension part 211, as such, when the banknote machine gate 2 is opened in an angle, the banknote machine gate 2 can be automatically opened due to the tension spring 4 being recovered, so that the operation is labor saving, and the banknote machine gate 2 can be immediately positioned and fully opened at a location close to the lateral plate 11, and a distance defined between the fastening column 12 of the lateral plate 11 and the fastening column 212 of the protruding extension part 211 is shortened for enabling the tension spring 4 to be recovered and shortened for being in an initial (not operating) status, as shown in FIG. 4; accordingly, the banknote machine gate 2 can be prevented from folding back after being opened due to the action force provided by the tension spring 4, thus the banknote case 5 can be pulled or pushed by a single hand of a user without a need of the banknote machine gate 2 being held by the other hand of the user, thereby allowing the banknote case 5 to be pulled or pushed for replacement in a convenient and labor saving means (as shown in FIG. 5), sharp edges of the opening 100 of the banknote machine 1 or sharp edges of the banknote machine gate 2 can be prevented from hurting the user, thereby increasing the safety and preventing danger from happening; when the banknote machine gate 2 is desired to be closed, an external force is applied and the hinge 3 is served as a rotation shaft, so that the fastening column 212 of the protruding extension part 211 is able to generate a displacement, the tension spring 4 connected to the fastening column 12 of the lateral plate 11 and the fastening column 212 is formed in a stretched status for storing the recovery force, at this moment, the banknote machine gate 2 is closed with the opening 100 of the banknote machine 1, thus an affection applied to the banknote machine gate 2 due to the recovery force of the tension spring 4 is very small, thereby preventing the banknote machine gate 2 from being opened (as shown in FIG. 1, FIG. 2 and FIG. 3).

As such, according to the present invention, with the fastening column 12 disposed on the lateral plate 11 at one side of the banknote machine 1 and the bottom plate 21 and the protruding extension part 211 and the fastening column 212 correspondingly disposed on the banknote machine gate 2, and the tension spring 4 being connected to the fastening column 12 of the lateral plate 11 and the fastening column 212 of the protruding extension part 211; the tension spring 4 is stretched when the banknote machine gate 2 is closed, when the banknote machine gate 2 is opened, the recovery force applied by the tension spring 4 enables the banknote machine gate 2 to be positioned, fastened and fully opened, thereby increasing the operation safety and the operation convenience, and the user can be prevented from being hurt by the sharp edges of the opening 100 of the banknote machine 1 and the sharp edges of the banknote machine gate 2 when replacing the banknote case 5, thereby lowering the possibility of being in danger. Accordingly, the present invention is novel and more practical in use comparing to prior.

Many modifications and other embodiments of the inventions set forth herein will come to mind to one skilled in the art to which these inventions pertain having the benefit of the teachings presented in the foregoing descriptions and the associated drawings.

Therefore, it is to be understood that the inventions are not to be limited to the specific examples of the embodiments disclosed and that modifications and other embodiments are intended to be included within the scope of the appended claims. Although specific terms are employed herein, they are used in a generic and descriptive sense only and not for purposes of limitation.

What is claimed is:

1. An improved closing structure of a banknote machine, characterized in that: including a banknote machine, having a lateral plate at one side thereof, wherein a front end of the lateral plate has an opening; a banknote machine gate, disposed at the opening at a front end of the banknote machine, an adjacent side of the lateral plate at the lateral side of the banknote machine and the banknote machine gate is provided with at least one hinge allowing the banknote machine gate to be opened or closed, and characterized in that: a lower portion of the banknote machine gate is disposed with a bottom plate, one side of the bottom plate defined being towards the banknote machine gate connecting to the hinge is extended with a protruding extension part, a top end of the protruding extension part is disposed with a fastening column, the lateral plate adjacent to the banknote machine is disposed with a fastening column, at least one tension spring connected to the fastening column of the lateral plate and the fastening column of the protruding extension part, so that the banknote machine gate is prevented from folding back after being opened via a pulling force provided by the tension spring.

2. The improved closing structure of the banknote machine as claimed in claim 1, wherein the fastening column of the protruding extension part is formed as a vertical fastening column.

3. The improved closing structure of the banknote machine as claimed in claim 1, wherein the fastening column disposed on the lateral plate of the banknote machine is formed as a horizontal fastening column.

4. The improved closing structure of the banknote machine as claimed in claim 1, wherein a rear end of the bottom plate is extended to a front portion at a bottom end of the opening of the banknote machine.

5. The improved closing structure of the banknote machine as claimed in claim 1, wherein a front portion of the banknote machine is formed with an accommodation space allowing a banknote case to be disposed in or taken out and a front end thereof is corresponding to the opening of the banknote machine.

* * * * *